United States Patent [19]

Kadin

[11] Patent Number: 4,653,068

[45] Date of Patent: Mar. 24, 1987

[54] FREQUENCY HOPPING DATA COMMUNICATION SYSTEM

[75] Inventor: Joseph Kadin, Florham Park, N.J.

[73] Assignee: ITT Corporation, New York, N.Y.

[21] Appl. No.: 662,753

[22] Filed: Oct. 19, 1984

[51] Int. Cl.$^4$ ............................................. H04B 15/00
[52] U.S. Cl. ........................................ 375/1; 375/58; 375/68
[58] Field of Search ............... 375/1, 2.1, 40, 45, 375/48, 54, 58, 62, 68, 115; 364/717; 331/78; 343/5 PN; 370/18, 19, 21, 107; 455/27, 29; 178/22.01

[56] References Cited

U.S. PATENT DOCUMENTS

| | | | |
|---|---|---|---|
| 3,878,527 | 4/1975 | Rensin et al. | 375/1 |
| 3,980,945 | 9/1976 | Bickford | 375/1 |
| 4,355,399 | 10/1982 | Timor | 375/1 |

Primary Examiner—Benedict V. Safourek
Attorney, Agent, or Firm—John T. O'Halloran; Thomas F. Meagher

[57] ABSTRACT

A frequency hopping data communication system for a bidirectional communication system is described in which improved operation in a jamming and/or fading environment is provided. A pseudo-noise code generator is utilized to provide a random sequence of ON-OFF pulses representative of binary numbers which cause a microprocessor to select data at a desired frequency which is then coupled to a frequency synthesizer to provide a controllable frequency and an improved anti-jam capability in both a receiver and transmitter.

9 Claims, 1 Drawing Figure

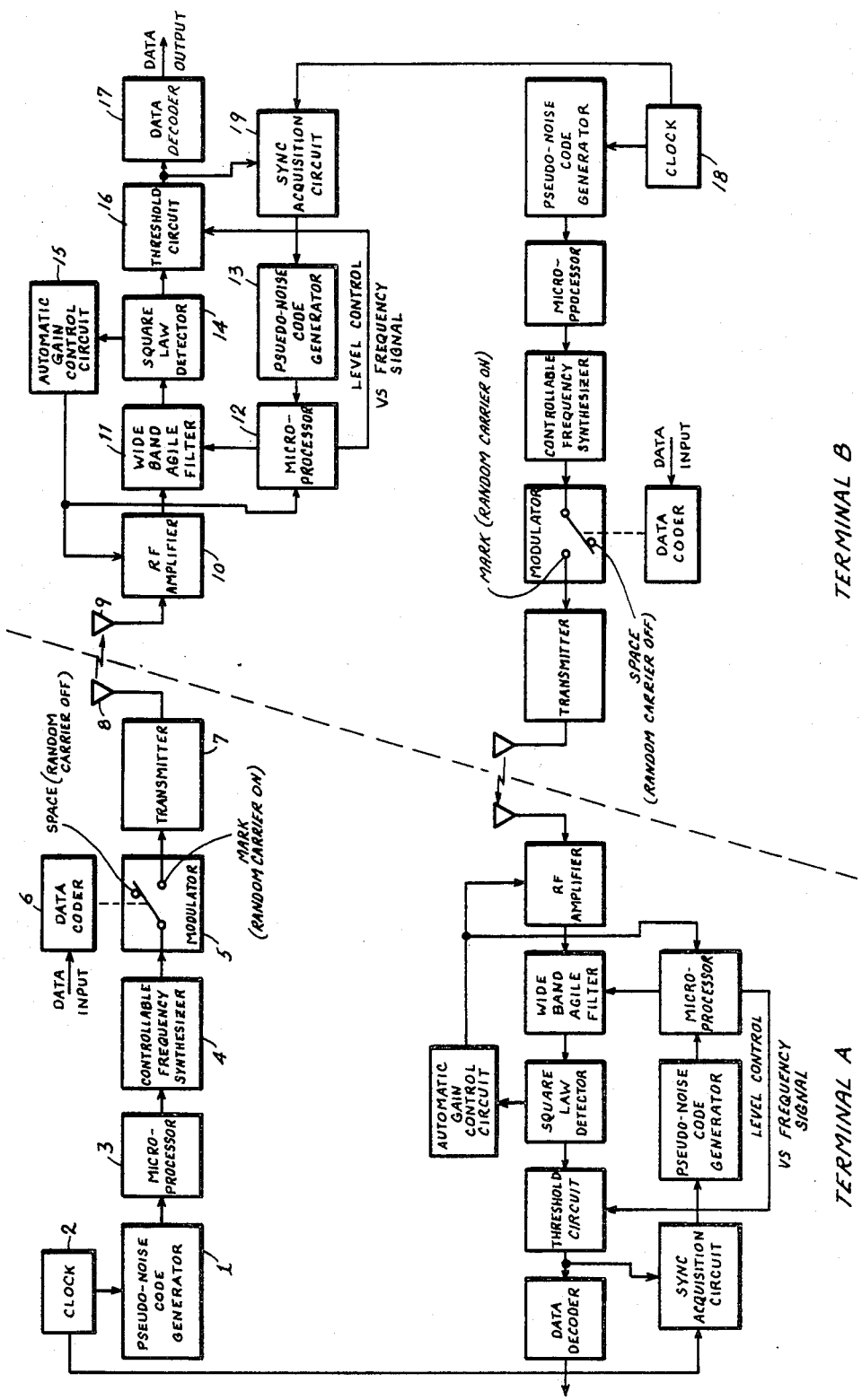

FREQUENCY HOPPING DATA COMMUNICATION SYSTEM

BACKGROUND OF THE INVENTION

The present invention relates to data communication systems and more particularly to spread spectrum data communication systems of the frequency hopping type.

Spread spectrum communication systems have been used in a variety of fields. In the communication system of this type, the transmitted bandwidth is much greater than the bandwidth or rate of the information to be transmitted. The carrier signal is modulated by some other function to widen or spread the bandwidth for transmission. The received signal is remapped into the original information bandwidth to reproduce a desired signal. The spread spectrum communication system has many useful advantages: a selective call is possible; since the power spectrum density is low, private communication is allowed; and it is little influenced by interference either due to multipath fading or jamming. From this standpoint, the spread spectrum system has found many uses, such as mobile communication systems, avionics systems, satellite communication systems, scatter communication systems of both the ionospheric and tropospheric type, direction finders and distance measuring equipment.

The spread spectrum systems can be categorized into a direct sequence system, a frequency hopping system, a time hopping system and a hybrid system which is a proper combination of the systems just mentioned. Of those communication systems, the frequency hopping system is frequently used in the field of mobile communication systems with a low traffic volume for a number of stations. Also frequency hopping systems can be employed in satellite communication systems and scatter type communication systems where a fading environment is present.

In the frequency hopping system a carrier frequency is shifted or jumped in discrete increments in a pattern dictated by a prepared code sequence, for instance, a PN (pseudo-noise) code, and M-sequence codes, Gold codes and the like, in synchronism with a change in the state of the codes. The resulting consecutive and time sequential frequency pattern is called a hopping pattern and the duration of each hopping frequency is called a chip. The transmitted information is embedded in the codes or embedded in each frequency of the carrier wave by a so-called FSK (frequency shift keying) modulation. The information signal thus spread-spectrum-modulated can be reproduced at a receiver.

In reproducing the information signal by the receiver, a synchronization acquistion process is first performed, in which the code pattern provided in the receiver is made accurately coincident with the code pattern generated in the transmitter in time position. Then, the spread spectrum signal is despread, and thereafter a well known demodulation is performed to extract the desired information. More particularly, a local reference signal of a frequency correspondingly determined by the same code pattern as that in the transmitter for every chip and received signal are mixed in a mixer in order to perform a correlation (despreading) process for converting the spread spectrum signal into the signal having a frequency bandwidth wide enough to extract the information. This system is described in detail in "Spread Spectrum Systems" by R. C. Dixon, published by John Wiley & Sons, Inc. in 1976. Following this despreading process, the desired information is extracted by usual demodulation techniques.

Such a system is not only useful in obtaining a proper coherent transmission in a fading environment, such as is present in mobile communications, satellite communications and scatter communications, the system is also jammer resistant.

SUMMARY OF THE INVENTION

An object of the present invention is to provide an improved spread spectrum communication system of the frequency hopping type.

Another object of the present invention is to provide a spread spectrum data communication system of the frequency hopping type that finds particular use in a jamming/fading environment, such as in mobile communications, satelite communications and scatter communications.

A feature of the present invention is the provision of a data communication system comprising first means to provide a predetermined random sequence of different frequencies; second means coupled to the first means, the second means being responsive to binary data to transmit at least one of the different frequencies of the random sequences of frequencies upon each occurence of one binary condition of the binary data and to block transmission of the random sequences of frequencies upon each occurrence of the other binary condition of the binary data; third means to provide a predetermined random sequence of numbers representing the different frequencies of the random sequence of frequencies; fourth means coupled to the second and the third means responsive to the random sequence of numbers to recover the binary data; and fifth means coupled to the third means and the fourth means to synchronize the third means to the second means.

Another feature of the present invention is the provision of a data transmitter comprising first means to provide a predetermined random sequence of different frequencies; and second means coupled to the first means, the second means being responsive to binary data to transmit at least one of the different frequencies of the random sequence of frequencies upon each occurrence of one binary condition of the binary data and to block transmission of the random sequence of frequencies upon each occurrence of the other binary conditions of the binary data.

Still a further feature of the present invention is the provision of a receiver to recover binary data transmitted by the presence of at least one different frequency of a random sequence of different frequencies and by the absence of the random sequence of different frequencies representing the other binary condition comprising first means to provide a predetermined random sequence of numbers representing the different frequencies of the random sequence of frequencies; second means receiving the transmitted binary data and coupled to the first means, the second means being responsive to the random sequence of numbers to recover the binary data and third means coupled to the first means and the second means to synchronize the first means to the random sequence of frequencies.

BRIEF DESCRIPTION OF THE DRAWING

The above-mentioned and other objects and features of the present invention and the manner in obtaining them will become more apparent by reference to the following description taken in conjunction with the drawing, the single FIGURE of which is a block diagram of a two way data communication system in accordance with the principles of the present invention.

DESCRIPTION OF THE PREFERRED EMBODIMENT

Referring to the FIGURE, the frequency hopping data communication system of the present invention is shown in block diagram form in a two way communication system including terminal A having a transmitter and a receiver and terminal B having a receiver cooperating with the transmitter of terminal A and a transmitter cooperating with the receiver of terminal A. This two-way communication system could be any communication system that could be subject to jamming and/or could experience fading. Such systems, for example, are mobile communication systems, satellite communication systems and scatter communication systems of the ionospheric and tropospheric type. The particular frequency hopping data communication system disclosed in the FIGURE can be used in any jamming and/or fading environment.

The components necessary to carry out a communication in one direction will now be described keeping in mind that the components to enable communication in the opposite direction are identical and operate in the same manner.

A pseudo-noise code generator 1 controlled by a clock 2 provides an output of a random sequence of on-off pulses representing binary numbers there applied to a microprocessor 3 including therein a predetermined data file containing the frequencies to be employed in the frequency hopping system of the instant application. Generator 1 may be any one of the psuedo-noise code generators disclosed in U.S. Pat. No. 4,142,240 issued Feb. 27, 1979 to C. R. Ward and R. A. Reilly, assigned to the same assignee as the instant application, whose disclosure is incorporated herein by reference. The binary numbers received from generator 1 causes microprocessor 3 to select from the data file the frequency desired. The data file output is coupled to a controllable frequency synthesizer 4 which responds to provide the frequency represented by the value read from the data file. Controllable frequency synthesizer 4 may be any programmable frequency sythesizer known in the prior art. The frequency from sythesizer 4 is coupled to modulator 5 which may be a mechanical switch, but preferrable it is an electronic switching circuit controlled by the data input converted to a binary on-off signal in data coder 6. The logic "1" (mark) and logic "0" (space) output of coder 6 controls modulator 5 such that when a logic "1" or a mark signal from coder 6 is coupled to modulator 5 the frequency from synthesizer 4 will be coupled to the transmitter 7 for transmission on antenna 8 from terminal A to antenna 9 of terminal B. The presence of a logic "0" or a space signal from coder 6 operates on the electronic switch of modulator 5 so as to block transmission of the frequency generated in synthesizer 4 to transmitter 7 so that there is an absence of a frequency at antenna 8.

The communication link between antennas 8 and 9 may be subjected to jamming or may be a fading environment, such as found in mobile, satellite and scatter communication systems.

The data signal is transmitted to antenna 9 in the form of the presence or absence of a randomly hopped frequency carrier. The system is basically an on-off modulation system except that the carrier will be hopped to random frequencies and locations. The signal pick-up on antenna 9 is applied to RF amplifier 10 whose output is coupled to a wideband agile filter 11. Filter 11 may be a tuned radio frequency device having capacitor or inductor or a combination of capacitor or inductor tuned circuits which may be selected by the binary information contained in the data file of microprocessor 12 with this data file being identical to that found in microprocessor 3. The number or value in the data file of microprocessor 12 is selected by the pseudo-noise code generator 13 that provides the identical random sequence of on-off pulses as that produced at psuedo-noise code generator 1. The operation of generator 13 and microprocessor 12 selects the appropriate tuned circuit of filter 11 so as to receive the hoped carrier carrying the modulation information.

Filter 11 also may be a wideband agile transversal filter disclosed in U.S. Pat. No. 4,164,628 issued Aug. 14, 1979 to C. R. Ward and R. A. Reilly, assigned to the same assignee as the instant application, whose disclosure is incorporated herein by reference. If filter 11 is of the type disclosed in this patent, then microprocessor 12 would contain a data file of the weights determining the frequency of response of the agile transversal filter.

The output of filter 11 is coupled to a square law detector 14 or any other circuit that will detect the peak amplitude of the output of filter 11 and, hence, the peak amplitude of the randomly hopped signal carrying the data information and a possible jamming signal at the same frequency. One output of detector 14 is coupled to an automatic gain control circuit 15 which provides an automatic gain control signal for controlling the gain of amplifier 10 and to also provide microprocesser 12 with information as to the amplitude of a pulse passed by wideband agile filter 11. Another output of square law detector 14 which is identical to the output of wideband agile filter 11 is coupled to threshold circuit 16 which has two threshold levels spaced one from the other. The actual value of the two amplitude thresholds is controlled by the microprocessor 12 based upon the amplitude information received from circuit 15 and the frequency of the signal expected to be received by the receiver based upon the output of generator 13 and the value from the data file of microprocessor 12. Thus, the amplitude threshold levels of threshold circuit sixteen are adjusted to a particular value dependant upon the amplitude of the signal received and the expected frequency of that signal and will therefore vary from pulse to pulse.

Threshold circuit 16 operates to block any signals that are below the lower amplitude threshold level since this would be noise. Threshold circuit 16 also operates to block passage of any signal occurring above the higher threshold level on the basis that the higher amplitude signal would be a jamming signal. Threshold circuit 16 will pass any single signal or frequency having an amplitude occurring between the two amplitude threshold levels. If two frequency signals appear between the two amplitude levels, the threshold circuit 16 operates to block these two signals on the basis that more than likely a jammer has provided one or the other of the two signals. Therefore, the threshold circuit 16 provides extreme robust immunity to jamming of the transmission of the data signal.

The signal passed by the threshold circuit 16 is coupled to a data decoder 17 so as to recover the data applied to the input of data coder 6. Data Coder 6 is any known type of error detection, error correction coders which by adding parity bits in a prescribed pattern to the bit stream allows the detection and correction of errors of the received perturbed, jammed or faded signal at the receiver. Specific coder types which are applicable are convolutional, Reed-Solomon, or BCH (Bose-Chaud HuriHocquenghem). Data decoder 17 detects and corrects any errors in the received perturbed signal due to jamming, fading, or interference by operating on the known coder 6 pattern. The random frequency hopping in conjunction with the coding offer a powerful anti-jam and anti-fading tool. The random frequency hopping results in independent fading from hop to hop and in addition distributes errors due to fixed frequency jammers and interference. The overall effect is to inhibit long strings or bursts of faded or jammed data bits which are not amenable to error detection or correction.

Synchronization of the system is accomplished by providing a very accurate clock for clock 2 which does not drift substantially in a twenty-four hour period. Therefore, by setting clock 2 once a day and at the same time setting clock 18 in terminal B at the exact same time as clock 2 running at exactly the same frequency, a rough synchronization has been accomplished, since the output of clock 18 will be employed directly to time the operation of pseudo-noise code generator 13 in terminal B. Due to fading and the multipath characteristic of the propogation medium between antenas 8 and 9 an effective drift or shift in the synchronized output of generators 1 and 13 can occur so that there is a phase displacement or time shift between the random sequence of frequencies received on antenna 9 and the output of generator 13. This shift is detected in the synchronization acquisition circuit 19 coupled to the output of threshold circuit 16 which removes a predetermined number of pulses from the clock signal from clock 18 so that the output of pseudo-noise code generator 13 is effectively shifted in phase to become coincident with the received random sequence so that the selection of the frequency of agile filter 11 is coincident with the frequency of the received pulse in amplifier 10. The acquisition circuit 19 thereby provides a synchronization of the receiver in terminal B so that the data transmitted on the randomly hopped carrier frequencies from terminal A can be properly received at terminal B in a jamming and/or fading environment.

While I have described above the principles of my invention in connection with specific apparatus, it is to be clearly understood that this description is made only by way of example and not as a limitation to the scope of my invention as set forth in the objects thereof and in the accompanying claims.

I claim:

1. A frequency hopping data communication system comprising:
   first means to provide a predetermined random sequence of different frequencies;
   second means coupled to said first means, said second means being responsive to binary data to transmit at least one of said different frequencies of said random sequences of frequencies upon each occurrence of one binary condition of said binary data and to block transmission of said random sequence of frequencies upon each occurrence of the other binary condition of said binary data;
   third means to provide a predetermined random sequence of numbers representing said different frequencies of said random sequence of frequencies;
   fourth means coupled to said second means and said third means responsive to said random sequence of numbers to recover said binary data; and
   fifth means coupled to said third means and said fourth means to synchronize said third means to said second means; wherein said first means includes
      a first pseudo-noise code generator coupled to a first clock to produce a first random bit stream,
      a first microprocessor coupled to said first code generator responding to successive portions of said first random bit stream to provide first output signals representing number corresponding to said different frequencies of said random sequence of frequencies, and
      a frequency synthesizer coupled to said first microprocessor responsive to said first output signals to provide said random sequence of frequencies and wherein said fourth means includes
      a wide band agile filter coupled to said second microprocessor to recover signals having said different frequencies of said random sequence of frequencies,
      amplitude measuring means coupled to said agile filter and said second microprocessor to provide a control signal proportional to the amplitude of said recovered signals for said second microprocessor, and
      threshold circuit means coupled to said amplitude measuring means, said acquisition circuit and said second microprocessor, said threshold circuit means having two spaced amplitude threshold levels adjusted by said second microprocessor in accordance with said amplitude control signal and the expected one of said different frequencies of said random sequence of frequencies to recover said binary data when individual ones of said different frequencies of said random sequence of frequencies have an amplitude non-coincidentally present between said two threshold levels.

2. A system according to claim 1, wherein said second means includes
   switching means coupled to said frequency synthesizer to transmit said one of said different frequencies upon each occurence of said one binary condition and to block transmission of said random sequence of frequencies upon each occurence of said other binary condition.

3. A system according to claim 2, wherein said fifth means includes
   a second clock, and
   a synchronization acquisition circuit coupled to said second clock, said fourth means and said second code generator responsive to said recovered binary data to slip the timing of said second bit stream to synchronize said second bit stream with said recovered binary data.

4. A frequency hopping data transmitter comprising:
   first means to provide a predetermined random sequence of different frequencies; and
   second means coupled to said first means, said second means being responsive to binary data to transmit at least one of said different frequencies of said random sequence of frequencies upon each occurrence of one binary condition of said binary data and to block transmission of said random sequence of frequencies upon each occurrence of the other binary condition of said binary data, to provide ON-OFF keying of said random sequence of frequencies; and wherein said first means includes a pseudo-noise code generator coupled to a clock to produce a random bit stream, a microprocessor coupled to said code generator responding to successive portions of said random bit stream to provide output signals representing numbers corresponding to said different frequencies of said random sequence of frequencies, and a frequency sythesizer coupled to said microprocessor responsive to said output signals to provide said random sequence of frequencies.

5. A transmitter acording to claim 4, wherein said first means includes a pseudo-noise code generator coupled to a clock to produce a random bit stream, a microprocessor coupled to said code generator responding to successive portions of said random bit stream to provide output signals representing numbers corresponding to said different frequencies of said random sequence of frequencies, and a frequency sythesizer coupled to said microprocessor responsive to said output signals to provide said random sequence of frequencies.

6. A transmitter according to claim 4, wherein said second means includes switching means coupled to said frequency synthesizes to transmit said one of said different frequencies of said random sequence of frequencies upon each occurrence of said one binary condition and to block transmission of said random sequence of frequencies upon each occurence of said other binary condition.

7. A frequency hopping data receiver to recover binary data transmitted by the presences of at least one different frequency of a random sequence of different frequencies representing one binary condition and by the absence of said random sequence of different frequencies representing the other binary condition in which said random sequence of frequencies is keyed ON and OFF, comprising:

first means to provide a predetermined random sequence of number representing said different frequencies of said random sequence of frequencies;

second means receiving said transmitted binary data and coupled to said first means, said second means being responsive to said random sequence of numbers to recover said binary data; and third means coupled to said first means and said second means to synchronize said first means to said random sequence of frequencies and wherein said first means includes a pseudo-noise code generator coupled to said third means to produce a random bit stream in synchronism with said random sequence of frequencies, and a microprocessor coupled to said code generator responding to successive portions of said random bit stream to provide output signals representing said random sequence of numbers.

8. A receiver according to claim 7, wherein said third means includes a clock, and a synchronization acquisition circuit coupled to said clock, said second means and said code generator responsive to said recovered binary data to slip the timing of said random bit stream to synchronize said random bit stream with said random sequence of frequencies.

9. A receiver according to claim 8, wherein said second means includes a wide band agile filter coupled to said microprocessor to recover signals having said different frequencies of said random sequence of frequencies, amplitude measuring means coupled to said agile filter and said microprocessor to provide a control signal proportional to the amplitude of said recovered signals for said microprocessor, and threshold circuit means coupled to said amplitude measuring means, said acquisition circuit and said microprocessor, said threshold circuit means having two spaced amplitude threshold levels adjusted by said microprocessor in accordance with said amplitude control signal and the expected one of said different frequencies of said random sequence of frequencies to recover said binary data when individual ones of said different frequencies of said random sequence of frequencies have an amplitude non-coincidentally between said two threshold levels.

* * * * *